May 29, 1928.
J. F. STRUBLE
1,671,909
SECTIONAL PACKING GLAND AND WASHER
Filed Oct. 29, 1925
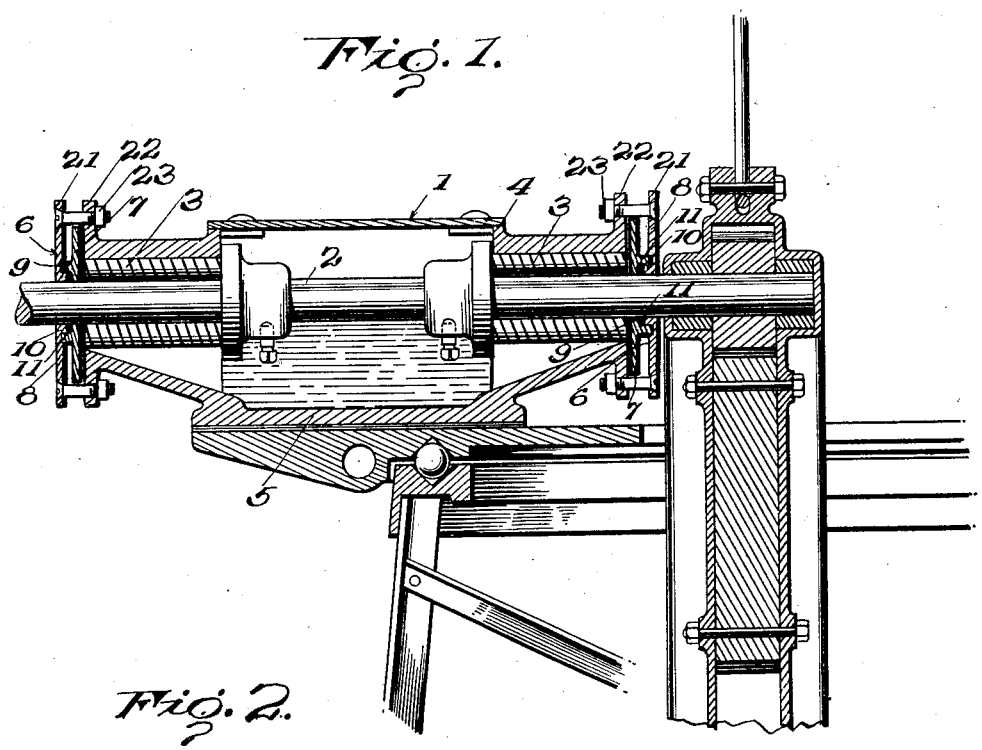
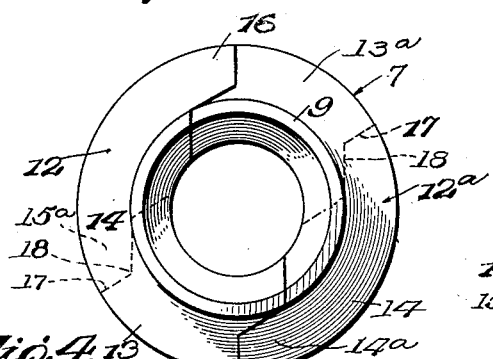
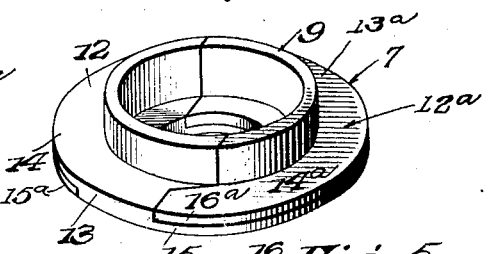
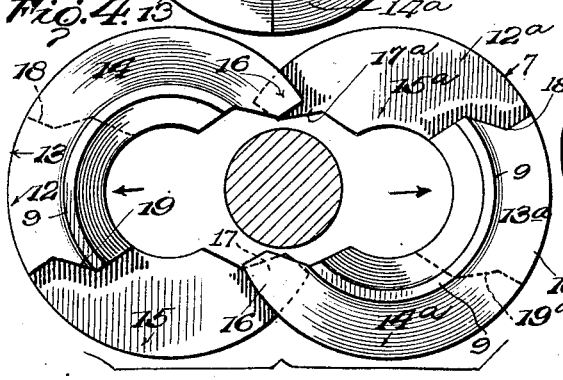
INVENTOR
J. F. Struble.
BY
ATTORNEYS Patented May 29, 1928.

1,671,909

UNITED STATES PATENT OFFICE.

JAMES F. STRUBLE, OF HUTCHINSON, KANSAS.

SECTIONAL PACKING GLAND AND WASHER.

Application filed October 29, 1925. Serial No. 65,702.

This invention relates to an improvement in sectional packing glands or washers and the present application is a continuation in part of my co-pending application for windmills, filed April 30, 1923, Serial No. 635,614.

The object of the present invention is to provide a sectional packing gland or washer which may be assembled on a shaft or other mechanical element without the necessity of taking down the shaft or removing objects mounted or keyed thereon, the sections of the gland or washer being moved laterally on to the shaft and into operative engagement with each other.

A further object is to provide a sectional packing gland or washer having these advantages and capacities and in which the sections when assembled are interlocking so as to hold themselves against displacement from the shaft or member on which they are mounted.

A still further object is to provide a sectional packing gland of the character specified and which provides an effective packing to exclude dust and dirt and prevent escape of oil or lubricant, the packing gland being adjustable to take up for wear as it occurs.

A further object is to provide a packing gland having these advantages and capacities and which is of simple and durable construction, reliable and effective in operation and comparatively inexpensive to manufacture and apply.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a view partly in vertical section and partly in side elevation showing the invention embodied in a packing gland and applied on a windmill, Figure 2 is a plan view of one of the parts of the packing gland, Figure 3 is a perspective view thereof, Figure 4 is a group view in plan showing the sections of the part illustrated in Figs. 2 and 3 prior to assembly, and Figure 5 is a detail perspective view showing the invention embodied in a sectional washer.

In the drawings, the numeral 1 designates generally a windmill which has a shaft 2 rotatably journaled in bearings 3 provided on a housing 4 in which a lubricant reservoir 5 is mounted.

The present invention proposes the provision of packing glands 6 one of which is located at the outer end of each of the bearings 3 to exclude dust and dirt from the bearings and to prevent escape of the lubricant supplied to the bearings from the reservoir 5. The packing glands are each of similar construction and each includes a pair of complementary members 7 and 8. The member 7 has a collar or annular flange 9 extending from its inner face and spaced inwardly from the wall of a central opening in said member, and the member 8 has a flange 10 extending inwardly from the wall of its central opening and which is adapted to fit snugly in the flange 9, the flanges or collars 9 and 10 serving to compress between the member 7 and 8 a suitable packing 11 and force the packing into engagement with the shaft 2 when the parts 7 and 8 are drawn together and against the bearing housings. Each of the members 7 and 8 includes sections 12 and 12$^a$. Each of these sections has a body portion shown at 13 and 13$^a$, respectively. The body portion 13 of section 12 has reduced extensions 14 and 15 at its ends, the extension 14 being co-planar with the inner face of the body 13 and being offset from the outer face thereof, while the extension 15 is co-planar with the outer face of the section 12 and offset from its inner face. The extensions 14 and 15 terminate in transversely reduced longitudinally extending tongues 16 and 17. At the juncture of the extensions 14 and 15 with the body portion 13, zig-zag shoulders 18 and 19 are provided. The body 13$^a$ of the section 12$^a$ has reduced extensions 14$^a$ and 15$^a$ at its ends and the extension 14$^a$ is co-planar with the inner face of the body portion 13$^a$ of section 12$^a$ and offset from its outer face while the extension 15$^a$ is co-planar with the outer face of section 12$^a$ and offset from its inner face. The extensions 14$^a$ and 15$^a$ terminate in transversely reduced tongues 16$^a$ and 17$^a$. The extensions 14$^a$ and 15$^a$ are provided at their inner ends on opposite faces of the sections with zig-zag shoulders 18$^a$ and 19$^a$, as shown clearly in Fig. 4. The shoulder 18 of section 12 is designed to abut the extremity of the extension 15$^a$ and the tongue 17$^a$ of section 12$^a$ when the sections are assembled, while shoulder 19 of section 12 abuts the extremity of section 14ª and the tongue 16ª of section 12ª. Due to this interengagement of the parts, the parts of the glands are interlocked in the assembly.

In order to hold the parts of the glands together and to cause these parts to exert the requisite pressure on the packing confined between their collars, the parts 8 are provided with apertured ears 21 which register with similar ears 22 provided on the housing of the adjacent bearings and with which suitable fastening devices, such as screws and nuts 23, co-act and when the nuts are tightened the members 7 will be clamped tightly against the housing.

As illustrated in Fig. 5 the invention is adapted for embodiment in a washer, as indicated at W and which is identical with the parts 7 of the packing glands except that the collars or annular flanges 9 thereof are omitted. In all respects the description hereinabove applies to the sectional washer.

It is to be understood that the invention whether embodied in a packing gland or in a washer is constructed of metal having sufficient resiliency to enable its parts to be assembled in the manner hereinabove described.

I claim:—

In a device of the class described a packing gland including a pair of complementary members having telescoping collars extending from their inner faces, each member comprising two sections, each section having a body with reduced extensions at its ends terminating in transversely reduced tongues, the outer face of one extension of each section being co-planar with the outer face of the body of said section and the other face of said extension being offset from the inner face of said section, the other extension of said section having one face co-planar with the inner face of the body of the section and the other face offset from the outer face of the section, zig-zag shoulders formed at the junction of the extensions with the bodies of sections, the shoulders of one section abutting the extremities of the extensions and tongues of the other section whereby the sections are interlocked when assembled.

JAMES F. STRUBLE.